United States Patent
Murphy-Chutorian et al.

(10) Patent No.: US 10,347,001 B2
(45) Date of Patent: Jul. 9, 2019

(54) LOCALIZING AND MAPPING PLATFORM

(71) Applicant: 8th Wall Inc., Palo Alto, CA (US)

(72) Inventors: Erik Murphy-Chutorian, Palo Alto, CA (US); Nicholas Butko, Cupertino, CA (US)

(*) Notice: Subject to any disclaimer, the term of this patent is extended or adjusted under 35 U.S.C. 154(b) by 34 days.

(21) Appl. No.: 15/582,318

(22) Filed: Apr. 28, 2017

(65) Prior Publication Data

US 2018/0315209 A1 Nov. 1, 2018

(51) Int. Cl.
*G06K 9/00* (2006.01)
*G06T 7/70* (2017.01)
*G06T 7/20* (2017.01)
*G06K 9/66* (2006.01)

(52) U.S. Cl.
CPC .............. *G06T 7/70* (2017.01); *G06K 9/66* (2013.01); *G06T 7/20* (2013.01); *G06T 2207/10016* (2013.01); *G06T 2207/10028* (2013.01)

(58) Field of Classification Search
CPC ...... G06K 9/00375; G06T 2207/30196; G06T 15/506; G06T 7/70
See application file for complete search history.

(56) References Cited

U.S. PATENT DOCUMENTS

| | | | | |
|---|---|---|---|---|
| 9,508,191 | B2 * | 11/2016 | Tabellion | G06T 15/506 |
| 2008/0088623 | A1 * | 4/2008 | Bukowski | G06T 15/00 |
| | | | | 345/423 |
| 2010/0239144 | A1 * | 9/2010 | Fichtinger | A61B 5/415 |
| | | | | 382/131 |
| 2013/0166484 | A1 * | 6/2013 | Hartmann | G06N 3/08 |
| | | | | 706/16 |
| 2014/0368807 | A1 * | 12/2014 | Rogan | G01S 17/50 |
| | | | | 356/28 |
| 2015/0104096 | A1 * | 4/2015 | Melax | G06T 7/004 |
| | | | | 382/154 |

OTHER PUBLICATIONS

Davison, Andrew J., et al; "MonoSLAM: Real-Time Single Camera SLAM"; IEEE Transactions on Pattern Analysis and Machine Intelligence, vol. 29, No. 6; Jun. 2007; 16 pages.
Klein, Georg, et al; "Parallel Tracking and Mapping for Small AR Workspaces"; Active Vision Laboratory Department of Engineering Science; University of Oxford; 2007; 10 pages.
Engel, Jakob et al; "LSD-SLAM: Large-Scale Direct Monocular SLAM"; Technical University Munich; 2014; 16 pages.
Mur-Artal, Rau'l et al; "ORB-SLAM: a Versatile and Accurate Monocular SLAM System"; IEEE Transactions on Robotics; 2015; 18 pages.

* cited by examiner

*Primary Examiner* — Amir Alavi
(74) *Attorney, Agent, or Firm* — Joseph L. Acayan

(57) ABSTRACT

Implementations generally relate to localizing and mapping. In one implementation, a method includes determining one or more map points in a point cloud space, where the point cloud space corresponds to a real physical environment. The method further includes determining movement information of one or more of the map points, where the determining of the movement information is performed by a neural network. The method further includes determining a self-position in the point cloud space based on the determined movement information.

18 Claims, 11 Drawing Sheets

LOCALIZING AND MAPPING PLATFORM

BACKGROUND

In mapping, simultaneous localization and mapping (SLAM) is a technique for building and updating a map of an environment while tracking a location in the environment. SLAM uses handcrafted keypoint detection and two-dimensional image feature extraction techniques to track the world in real time. SLAM may be applied to various technologies such as virtual reality, augmented reality, mixed reality, tracking, mobile apps, unmanned vehicles, rovers, and robots.

SUMMARY

Implementations generally relate to localizing and mapping. In one implementation, a method includes determining one or more map points in a point cloud space, where the point cloud space corresponds to a real physical environment. The method further includes determining movement information of one or more of the map points, where the determining of the movement information is performed by a neural network. The method further includes determining a self-position in the point cloud space based on the determined movement information.

Other aspects and advantages of the described implementations will become apparent from the following detailed description, taken in conjunction with the accompanying drawings, illustrating by way of example the principles of the described implementations.

DETAILED DESCRIPTION

Implementations generally relate to localizing and mapping. Implementations enable a mobile device such as a cell phone to perform dead reckoning, which uses information from a camera and inertial sensors (e.g., gyroscopes and accelerometers) to accurately determine its current position, or self-position, as well as to create maps and build point cloud representations of the physical world around the mobile device. Implementations also enable visual and inertial odometry, which uses information from a camera and inertial sensors to determine self-position and to estimate change in self-position over time. Various implementations described herein may be applied to various technologies such as virtual reality, augmented reality, mixed reality, tracking, mobile apps, unmanned vehicles, rovers, and robots.

Rather than using handcrafted keypoint detection and mere image features to track the world, implementations use a neural network to detect local points and sensor information to predict three-dimensional (3D) movement (e.g., in six degrees of freedom) of those local points based on subsequent video or image frames. These functions are performed in parallel. As described in more detail below, a neural network is a network of processors connected by unidirectional communication channels. As described in more detail herein, six degrees of freedom refers to the freedom of movement in 3D space.

These local points may be referred to as map points in a point cloud space, where a point cloud space is a set of data points in a coordinate system (e.g., Cartesian X, Y, Z coordinate system). In various implementations, learned or trained neural networks may be tailored to the problem of detecting motion, predicting out-of-plane translation and rotation, and providing accurate tracking information (e.g., with a monocular camera).

As described in more detail below, in various implementations, a method includes determining one or more map points in a point cloud space, where the point cloud space corresponds to a real physical environment. The method further includes determining movement information of one or more of the map points, where the determining of the movement information is performed by a neural network. The method further includes determining a self-position in the point cloud space based on the determined movement information.

Figure 1:
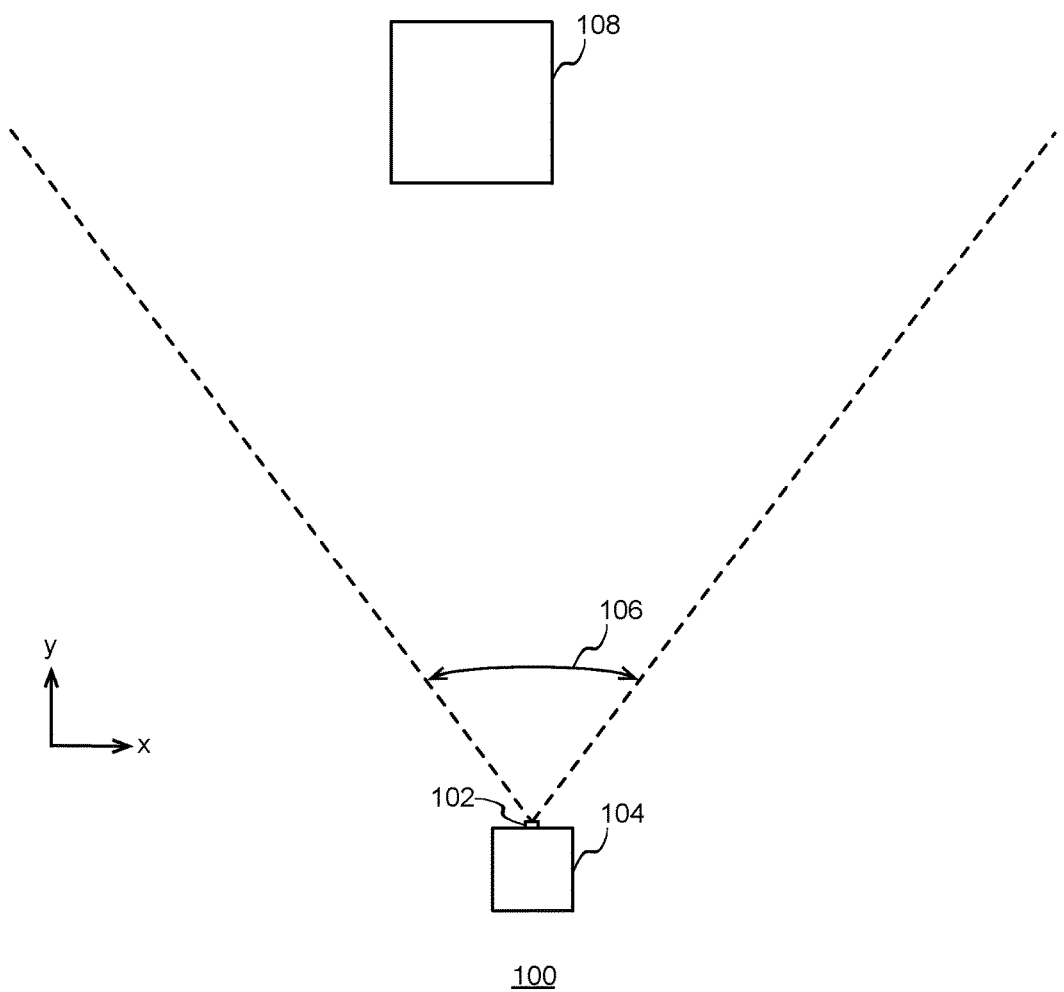
FIG. 1 illustrates a top-view diagram of an example physical environment, including a camera in a first position relative to an example object, according to some implementations.
Figure 2:
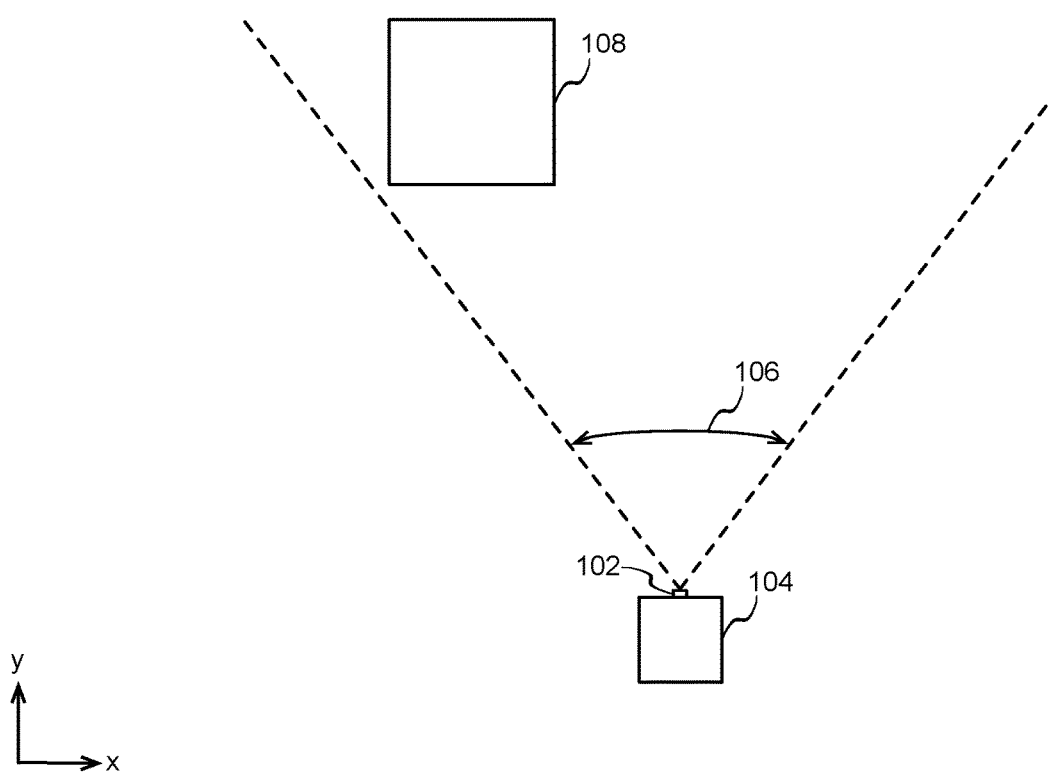
FIG. 2 illustrates a top-view diagram of the example physical environment, including the camera in a second position relative to the example object, according to some implementations.

FIGS. 1 and 2 show top views of a camera in an example physical environment, where the camera moves relative to the example object in the same physical environment.

FIG. 1 illustrates a top-view diagram of an example physical environment 100, including a camera in a first position relative to an example object, according to some implementations. As shown, a camera 102 is attached or integrated with a mobile unit 104. Mobile unit 104 may represent various items that have a camera. For example, mobile unit 104 may be a mobile device such as a cell phone, as well as a robot, a vehicle, a rover, etc.

Camera 102 has a predetermined field of view 106 through which camera 102 observes the physical world at any given moment, including objects such as object 108, for example. As shown, camera 102 is in a first position relative to object 108. For ease of illustration, only one example object is shown. In various scenarios, camera 102 may observe multiple objects in field of view 106.

FIG. 2 illustrates a top-view diagram of physical environment 100, including camera 102 in a second position relative to object 108, according to some implementations. As shown, in the second position, camera 102 has moved closer to object 108 along a y-axis and has moved to the right of object 108 along an x-axis.

Figure 3:
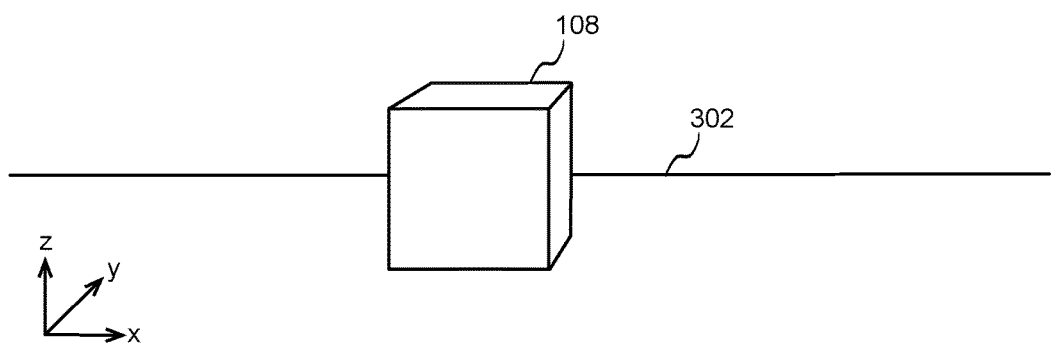
FIG. 3 illustrates a perspective-view diagram of the example object from the perspective of the camera in the first position, according to some implementations.
Figure 4:
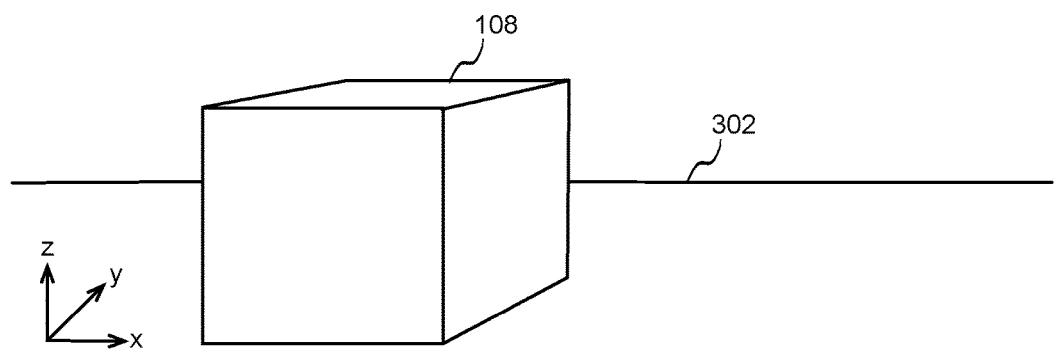
FIG. 4 illustrates a perspective-view diagram of the example object from the perspective of the camera in the second position, according to some implementations.

FIGS. 3 and 4 show perspective views of physical environment 100, including object 108, where the view of camera 102 changes as camera 102 moves relative to object 108 in the physical environment. In these example implementations, the perspective views of FIGS. 3 and 4 correspond to the top views of FIGS. 1 and 2, respectively.

FIG. 3 illustrates a perspective-view diagram of object 108 in physical environment 100 from the perspective of camera 102 in the first position, according to some implementations. As indicated above, the perspective view of FIG. 3 corresponds to the top view of FIG. 1. Also shown, is a horizontal element 302 in order to show perspective. Horizontal element 302 may represent various aspects of the physical space. For example, in some implementations, horizontal element 302 may be the horizon. In some implementations, horizontal element 302 may be the edge of a table.

FIG. 4 illustrates a perspective-view diagram of object 108 in physical environment 100 from the perspective of camera 102 in the second position, according to some implementations. As indicated above, the perspective view of FIG. 4 corresponds to the top view of FIG. 2.

For ease of illustration, camera 102 is shown to have moved on the same plane as object 108, along the x-axis and y-axis. In other scenarios, camera 102 may move along the z-axis.

As described in more detail herein, a 3D view of the physical environment may be projected into the view of camera 102 (e.g., via the camera lens of camera 102). Camera 102 may then capture images of the 3D view, including any objects in field of view 106 of camera 102. Camera 102 may capture images in multiple image frames as camera 102 moves within environment 100.

As described in more detail herein, a point cloud space may represent the physical environment 100, where the point cloud space is made up of map points. These map points constitute a 3D map of the physical space. In various implementations, some of the map points may be projected into the view of camera 102, captured in two-dimensional (2D) images frames. In some implementations a point cloud space may be represented in Cartesian coordinates or in other suitable coordinate system coordinates (e.g., polar, cylindrical, spherical, and/or homogeneous coordinates, etc.). Such coordinate system coordinates uniquely determine the position of each map point in the point cloud space.

As described in more detail herein, a neural network utilizes movement information associated with the captured 2D image frames to determine the position of the camera in the point cloud space of the physical environment. The neural network determines how the map points move in three dimensions through observations of map points in 2D image frames captured by camera 102. Based on movement information associated with the map points, the neural network determines the self-position of camera 102.

Example implementations of the point cloud space and the determination of the self-position of a camera is described in more detail herein.

Figure 5:
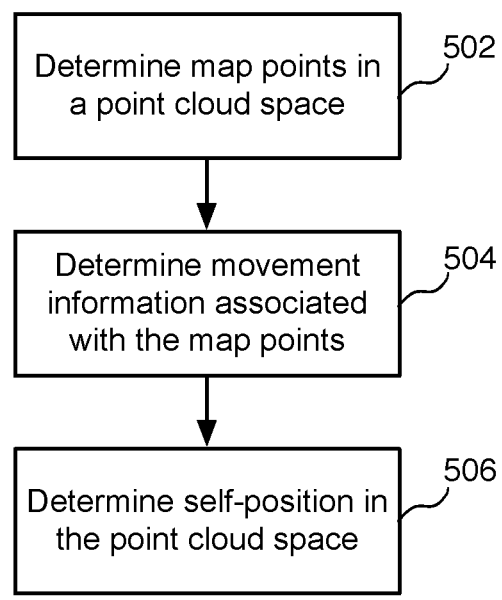
FIG. 5 illustrates an example flow diagram for determining a self-position of the camera, according to some implementations.

FIG. 5 illustrates an example flow diagram for determining a self-position of a camera, according to some implementations. Various implementations described herein improve the ability to determine self-position and motion of the camera relative to salient map points in the point cloud space.

A method is initiated at block 502, where the system determines one or more map points in a point cloud space, where the point cloud space corresponds to a real physical environment. For example, the physical environment may be an outdoor environment, an indoor environment, etc. In an example scenario, if physical environment 100 is an outdoor environment, object 108 may represent any object such as a tree, a building, a cloud, etc. In another example scenario, if physical environment 100 is an indoor environment, object 108 may represent any object such as a piece of furniture, an appliance, a window, a door, etc. Other examples are possible. The particular object that object 108 may represent may vary, and will depend on the particular scenario.

In various implementations, to determine map points in the point cloud space, the system determines 2D positions of map points in 2D windows or views (e.g., image frames). In various implementations, the map points may represent portions of objects in the physical environment. For example, object 108 in the examples of FIGS. 1-4 may represent a piece of furniture in a room full of other pieces of furniture, a building in a cluster of buildings, a tree in a grove of trees, etc. As indicated above, for ease of illustration or simplicity, object 108 is shown alone. Other objects may also be present in a given image frame.

Figure 6:
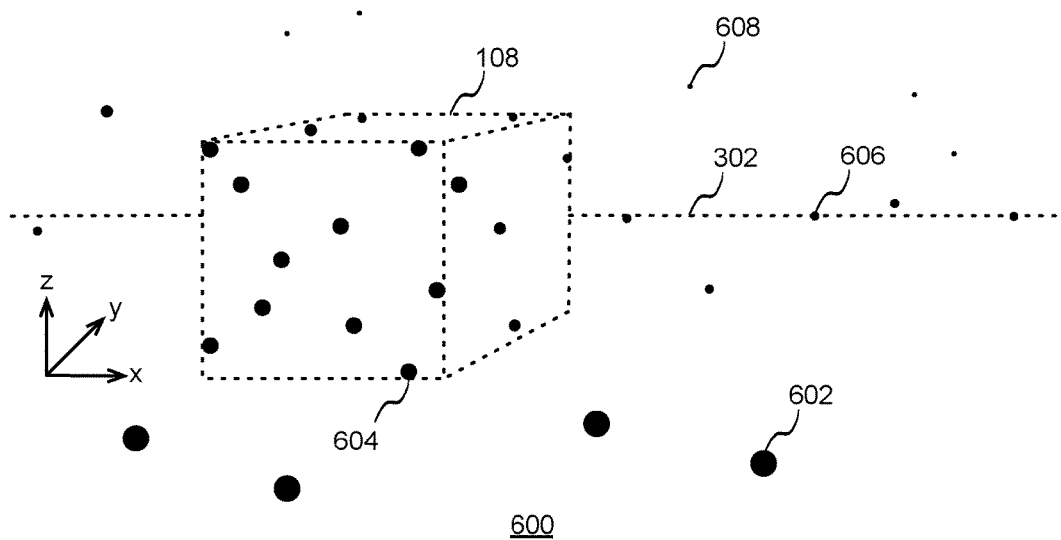
FIG. 6 illustrates map points in a point cloud space corresponding to the example object, according to some implementations.

FIG. 6 illustrates map points in a point cloud space 600 corresponding to object 108, according to some implementations. In this example implementation, point cloud space 600 corresponds physical environment 100 of FIGS. 1-4. Point cloud space 600 may represent any real physical environment, and map points in point cloud space may represent multiple objects and/or portions of objects in the physical environment, where camera 102 itself is also in point cloud space 600. Camera 102 is not shown in point cloud space 600, because this particular image is from the perspective of camera 102.

For ease of illustration, implementations are described herein in the context of object 108 being stationary. In some implementations, any given object such as object 108 may move within the point cloud space. The system may take into account such movements of objects in the point cloud space.

In various implementations, the system rejects outlier points as the system tracks points. Outlier points may be point correspondences that do not match the global motion. Such outlier points may come from errant matches, repetitive textures, and/or objects in the scene that move independently from the background. In various implementations, a goal in outlier removal is to detect incorrect point correspondences and remove them before computing any global averages or motion estimates. Implementations may use any suitable outlier detection techniques such as random sample consensus (RANSAC), and others. RANSAC is a data-driven way of ignoring individual outlier points from a data sample.

In various implementations, the system may take into account various information when detecting outlier points. For example, in some implementations, outlier points may include points that move inconsistently with the majority of points in the point space are ignored (likely not background).

In some implementations, outlier points may include points that move inconsistently with device gyro/accelerometer data, and the system may ignore such points (likely not attached to background). In some implementations, outlier points may be points in a local region that move independently of the background. Such points are likely part of a non-fixed object, and the system may ignore such points or tracked such points as an independent object. In some implementations, outlier points may include points that appear with certain appearance/textures and are known or learned to be low-quality points. The system may ignore these points.

In various implementations, point cloud space 600 is a set of data points or map points in a 3D coordinate system. As such point cloud space 600 is a 3D map of the physical environment. Point cloud space 600 may be defined by x-, y-, and z-coordinates, where each map point in the 3D coordinate system may be referred to as a map point. Point cloud space 600 may also be referred to as a point cloud.

As indicated herein, the map points of point cloud space 600 represent portions of objects in the physical environment. For example, point cloud space 600 includes map points 602, 604, 606, and 608, among other map points. Map points 602, 604, 606, and 608 may represent any number of map points, and the particular number of map points in a given point cloud space will depend on the particular implementation.

As indicated herein, the map points are located in a 3D coordinate system. As shown, larger map points such as map point 602 are closer to the camera. Relatively smaller map points such as map point 604 are farther from camera 102. Yet smaller map points such as map point 606 are farther from camera 102. In this example implementation, the smallest map points such as map point 608 are the farthest from camera 102. These are example sizes and relative distances from camera 102. The actual distances, and corresponding sizes, may vary and will depend on the particular implementation.

In some implementations, the map points in point cloud space 600 may include subsets of map points, where a given subset of map points may represent portions of an external surface of a given object. For example, some map points such as map point 604 may corresponding to a portion of object 108. Some map points such as map point 606 may correspond to a portion of horizon 302. Other map points such as map points 602 and 608 may correspond to other objects, and the particular object will depend on the particular implementation. For example, other objects may include a table, floor or ground, a wall, a sky, etc.

In various implementations, point cloud space 600 is learned in real-time as camera 102 captures map points in image frames. In some implementations, the system may store map points of the point cloud space for future use.

In some implementations, the determination of map points may be referred to as keypoint detection. During keypoint detection, the system searches an image frame to find distinguishable map points in the image frame, where the map points are stable and repeatable across image frames. In other words, the system identifies the same map points across different image frames taken by camera 102 over time. Map points may represent areas of high texture in x-direction and/or y-direction and/or z-direction. Such map points may represent edge boundaries and/or other high-contrast and/or other landmarks or portions of objects in a point cloud space. The terms map point and keypoint may be used interchangeably.

At block 504, the system determines movement information associated with one or more of the map points. In various implementations, the movement information includes changes in various types of positional information, where each type of positional information is used for determining movement of map points relative to a camera 102. As described in more detail herein, positional information may include values associated with variables such as six degrees of freedom, including location, rotation, as well as others variables such as inertia.

In various implementations, six degrees of freedom refers to the freedom of movement in 3D space, where a body is free to move in three perpendicular axes (e.g., forward, backward, up, down, left, and right (translational motion) and/or rotate about three perpendicular axes (e.g., pitch, yaw, and roll).

In various implementations, movement information may include 2D positions in the image frames. For example, in some implementations, movement information may include 2D changes in location of one or more of the map points in a 2D window, from one image to the next image frame. In some implementations, movement information may also include 2D changes in rotation of one or more of the map points in a 2D window, from one image to the next image frame.

In various implementations, movement information also may include 3D changes in the point cloud space. For example, in some implementations, movement information also includes 3D changes of one or more of the map points (changes in six degrees of freedom information). In various implementations, information associated with 3D changes in the point cloud space inherently includes information associated with 2D changes in a 2D window. Example implementations of these types of movement information and other types of movement information are described in more detail herein.

As described in more detail herein, in various implementations, the determining of the movement information is performed by a neural network. The neural network determines movement information in 2D space and 3D space. Example implementations directed to a neural network determining movement information associated with one or more of the map points are described in more detail herein in connection with FIGS. 7-10, for example.

At block 506, the system determines a self-position in the point cloud space based on the determined movement information. In various implementations, the self-position in the point cloud space represents the self-position of camera 102 in the physical environment. The position of camera 102 is referred to as self-position in that the position is from the perspective of camera 102.

While implementations are described herein in the context of a self-position of a camera, these implementations and other may also apply to any object or person associated with the camera. For example, as indicated herein, camera 102 may be attached to or integrated into another device such as a mobile device (e.g., smart phone, etc.). As such, the determination of the self-position may be extended to the position of the mobile device. Similarly, from a user perspective, the self-position may be extended to the position of the user holding or wearing the mobile device that has camera 102 attached or integrated into it.

As described in more detail herein, the system determines the self-position based on the movement information by analyzing differences or changes in movement information of one or more map points in point cloud space 600 relative to camera 102. For example, the system may determine differences in a set of one or more 3D, 6 degrees of freedom observations from one image frame to the next image frame. As described in more detail herein, in various implementations, the determining of the self-position is performed by the neural network.

Figure 9:
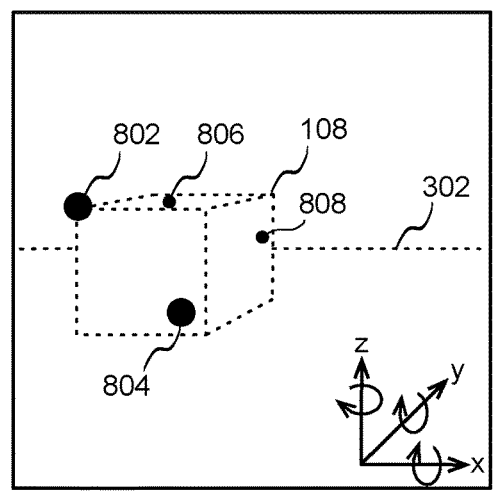
FIG. 9 illustrates an example image frame that includes example map points in a point cloud space corresponding to the example object, where the example object is captured by the camera in the second position, according to some implementations.
Figure 10:
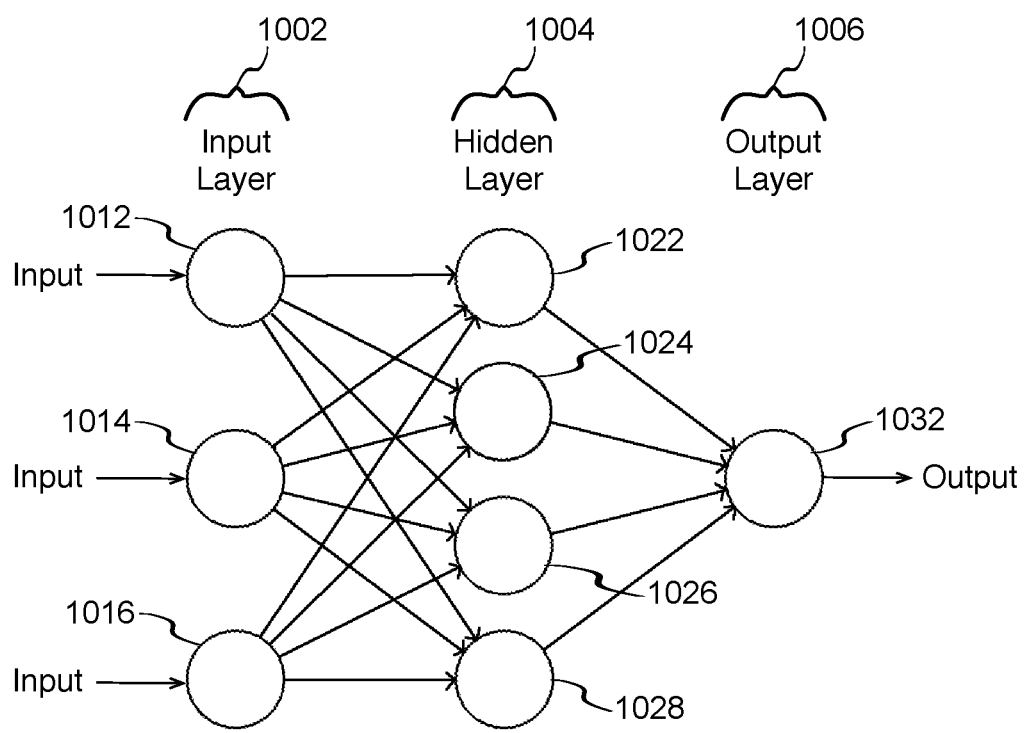
FIG. 10 illustrates a block diagram of an example neural network, which may be used for some implementations described herein.

Example implementations directed to the determining of movement information associated with one or more of the map points are described in more detail herein in connection with FIGS. 9 and 10, for example.

In various implementations, neural network 1000 determines the self-position of camera 102 based on the movement information, where the self-position represents the self-position of camera 102 in the physical environment. In some implementations, the self-position is relative to other objects or map points in the point cloud space. In some implementations, the self-position of camera 102 is relative to a starting point of camera 102 in the point cloud space. Example implementations directed to a neural network are described in more detail herein.

In some implementations, to determine the self-position of camera 102, neural network 1000 estimates it's position. For example, neural network 1000 may estimate the self-position based on known map points in the point cloud space, or other known information. Neural network 1000 may then adjust the self-position based on movement information of one or more map points.

In some implementations, in addition to neural network 1000 tracking the self-position of camera 102, neural network 1000 also stores each self-location. As such, neural network 1000 tracks and maps the movement or path of camera 102.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 7:
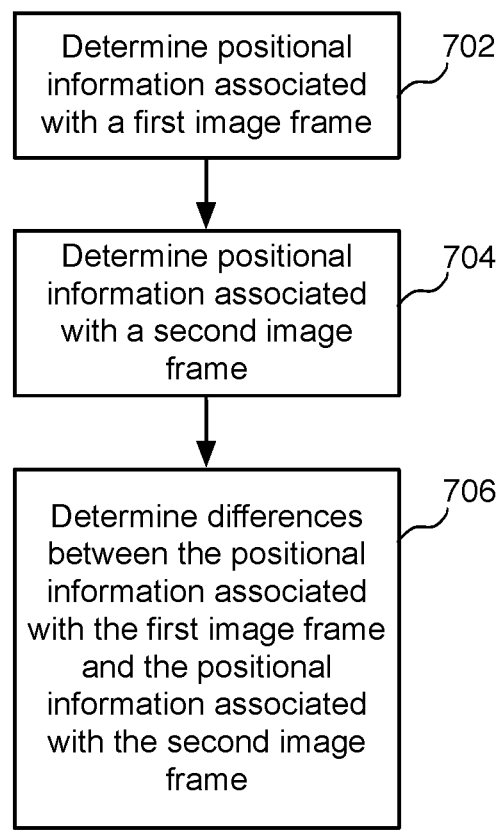
FIG. 7 illustrates an example flow diagram for determining movement information, according to some implementations.

FIG. 7 illustrates an example flow diagram for determining movement information, according to some implementations. As described in more detail herein, the movement information includes changes in positional information (e.g., changes in positional information from image frame to image frame). For example, in various implementations, the movement information is based on differences between positional information associated with map points in subsequent image frames. As indicated herein, in various implementations, the map points are projected into the 2D view of camera 102. Camera 102 captures images of the map points in multiple image frames as the camera moves in the point cloud space. The system determines movement information associated with changes in positional information of one or more of the map points by comparing the map points in subsequent 2D image frames and inertial information associated with the map points. As described in more detail herein, the system tracks map points in the point cloud space in real time.

A method is initiated at block 702, where the system determines positional information associated with a first image frame. As indicated herein, positional information may include values associated with variables such as location, rotation, six degrees of freedom, as well as others variables such as inertia. Such positional information is associated with one or more map points in the image frame.

Figure 8:
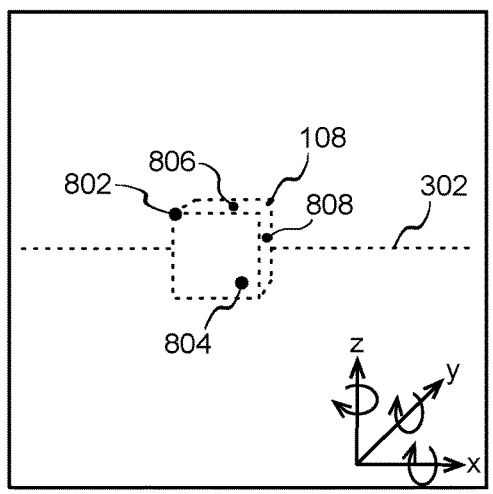
FIG. 8 illustrates an example image frame that includes example map points in a point cloud space corresponding to the example object, where the example object is captured by the camera in the first position, according to some implementations.

FIG. 8 illustrates an example image frame 800 that includes example map points in a point cloud space corresponding to object 108, where object 108 is captured by camera 102 in the first position, according to some implementations.

As shown, image frame 800 shows example map points 802, 804, 806, and 808. While map points 802, 804, 806, and 808 are shown in a 2D image frame, map points 802, 804, 806, and 808 are associated with 2D and 3D positional information. For example, each of map points 802, 804, 806, and 808 has associated including x-, y-, and z-locations, as indicated by the x-y-z directional arrows in the x-y-z axis shown. Each of map points 802, 804, 806, and 808 also has associated x-, y-, and z-orientations, as indicated by the x-y-z rotational arrows in the x-y-z axis shown. Further example implementations of 2D and 3D positional information are described in more detail herein.

For reference and perspective, FIG. 8 also shows an indication of example object 108 and horizon 302 (indicated with dotted lines). As indicated herein in connection with FIG. 6, map points may be associated with various different objects in point cloud space 600.

At block 704, the system determines positional information associated with a second image frame. As indicated herein, such positional information is associated with one or more map points in the image frame. In various implementations, the system determines the positional information associated with map points in the image frame that were captured in the previous image frame. In other words, the system looks for like features from image frame to image frame in order to determine whether map points in a previous image frame exist in a current image frame. The system continues to observe and track for each map point where there is a match from the current frame to the previous frame.

FIG. 9 illustrates an example image frame 900 that includes example map points in a point cloud space corresponding to object 108, where object 108 is captured by camera 102 in the second position, according to some implementations.

As shown, image frame 900 shows map points 802, 804, 806, and 808, as well as an indication of object 108 and horizon 302. Note that the sizes of the circles shown are merely illustrative to show points that are closer or farther away in the 3D space. For example, the sizes of the circle corresponding to the map points may be inversely proportional to the proximity to camera 102. In other words, the shorter the distance of a given map point to camera 102, the larger the circle. For example, comparing image frame 900 of FIG. 9 to image frame 800 of FIG. 8, map points 802, 804, 806, and 808 of image frame 900 are shown as larger circles than those of image frame 800, because the map points of image frame 900 are relatively closer to camera 102. The increased size and change of positioning of object 108 as indicated by the dotted lines provides additional perspective on the change of position of each of map points 802, 804, 806, and 808 from image frame 800 to image frame 900.

In various implementations, time lapse from image frame to image frame may be relatively small (e.g., microseconds, nanoseconds, etc.), and the actual time between two image frames may vary depending on the particular implementation. For ease of illustration, in this example implementation, image frame 900 is presumed to have been captured a sufficient amount of time after image frame 800 was captured in order to show sufficient differences between image frames 800 and 900.

Similar to image frame 800 of FIG. 8, map points 802, 804, 806, and 808 as shown in image frame 900 of FIG. 9 are associated with 2D and 3D positional information, including x-, y-, and z-locations, and rotation about the x-, y-, and z-axes. In various implementations, there may be various ways to express rotations such as including 3 independent rotations about axes (e.g., Euler angles/Tait-Bryan Angles), a Rotation matrix (e.g., either 3×3 or 4×4 with homogenous coordinates), or quaternions (e.g., 4×1 normalized vector with special operations for rotation).

Further example implementations of 2D and 3D positional information are described in more detail herein.

For ease of illustration, FIGS. 8 and 9 show an example subset of map points. The actual map points observed and tracked, and object(s) to which the map points are associated will vary and will depend on the particular implementation. In other words, example image frames 800 and 900 may not have all of the map points shown and/or may have other map points including map points associated with other objects instead of, or in addition to, those shown herein.

At block 706, the system determines one or more differences between the positional information associated with the first image frame and the positional information associated with the second image frame. In various implementations, the movement information includes the differences between the positional information associated with the first image frame and the positional information associated with the second image frame.

In various implementations, the neural network of the system determines the differences from one image frame to the next image frame (e.g., from image frame 800 of FIG. 8 to image frame 900 of FIG. 9) based on the positional information associated with each image frame that is input to the neural network.

FIG. 10 illustrates a block diagram of an example neural network 1000, which may be used for some implementations described herein. In various implementations, as information flows through neural network 1000, neural network 1000 adapts or learns based on the information each node receives. As such, neural network 1000 is a computational model based on the structure and functions of biological neural networks. Neural network 1000 may also be referred to as an artificial intelligence neural network or neural net.

As shown, neural network 1000 has an input layer 1002, a hidden layer 1004, and an output layer 1006. Input layer 1002 includes input nodes 1012, 1014, and 1016. Hidden layer 1004 includes hidden nodes 1022, 1024, 1026, and 1028. Output layer 1006 includes output node 1032.

In various implementations, the nodes of neural network 1000 are connected by unidirectional communication channels or connections, which carry numeric data. In some implementations, the nodes operate on their local data and on the inputs they receive via the connections.

In various implementations, neural network 1000 receives at its input nodes 1012, 1014, and 1016 from various inputs associated with map points. For example, in some implementations, input to neural network 1000 includes 2D digital images, which are digitized image frames from camera 102. For example, such 2D digital images may include image frames 800 and 900 of FIGS. 8 and 9, respectively.

In various implementations, neural network 1000 may receive at its input nodes 1012, 1014, and 1016 other types of information associated with the map points. For example, in some implementations, input to neural network 1000 may also include inertial information associated with one or more map points. In some implementations, the inertial information may include gyro information provided by one or more gyro sensors, acceleration information provided by an accelerometer, compass information provided by a compass, and other types inertial information. In some implementations, the inertial information may be used to determine rotational changes of one or more map points. In some implementations, input to neural network 1000 may also include depth information provided by one or more depth sensors, and other information associated with one or more map points. Neural network 1000 may use any combination of these types of inputs including sensor information independently, in addition to, or in lieu of visual information such as 2D image frames.

In various implementations, hidden nodes 1022, 1024, 1026, and 1028 each have an output that is connected to the inputs of other nodes, which may include other hidden nodes or output nodes. Hidden nodes are hidden in that they not visible as a network output. Based on the various inputs, hidden nodes 1022, 1024, 1026, and 1028 determine 2D and 3D changes in positional information. As indicated herein, in various implementations, information associated with 3D changes in the point cloud space inherently includes information associated with 2D changes in a 2D window. For example, such changes may include changes to six degrees of freedom variables of one or more map points, as well as changes in other variables associated with one or more map points (e.g., changes in inertial information, changes in depth information etc.).

Neural network 1000 determines actual motion within the 3D environment from 2D digitized image frames and/or other sensor information (e.g., inertial information, depth information, and other information input to neural network 1000, etc.). In other words, neural network 1000 determines not merely motion within the 2D image frames but also other information in the real world, such as 3D motion and changes in 3D positional information associated with map points in the point cloud space.

Referring to image frames 800 and 900, neural network 1000 may determine any translational movement of object 108. For example, neural network 1000 may determine that object 108 has moved closer to camera 102 by a particular distance (e.g., 2 inches, etc.), and that object 108 has moved to the left of camera 102 by a particular distance (e.g., 1.5 inches, etc.). Neural network 1000 may determine any rotational movement of object 108. For example, neural network 1000 may determine that object 108 has rotated relative to camera 102 by a particular number of degrees (e.g., 10 degrees, etc.). These are example changes in the position of object 108 relative to camera 102. The actual amount of change and what variables change (e.g., six degrees of freedom variables) may vary, and will depend on the particular implementation.

In various implementations, hidden nodes 1022, 1024, 1026, and 1028 of neural network 1000 may determine various information associated with one or more map points in the point cloud space. For example, hidden nodes 1022, 1024, 1026, and 1028 may determine any movement information, including what positional information (e.g., positional variables, etc.) have changed, and the amount of change. In various implementations, hidden nodes 1022, 1024, 1026, and 1028 of neural network 1000 perform their functions in parallel, which increases performance. Outputs provided by hidden nodes 1022, 1024, 1026, and 1028 may be referred to as intermediate outputs.

In various implementations, neural network 1000 automatically learns and automatically reconciles information from visual and sensor data from camera 102 and/or one or more sensors. For example, neural network 1000 may combine visual or sensor information that corroborates, where information corroborates if the information is consistent. Neural network 1000 may ignore visual or sensor information that does not corroborate, where information does not corroborate if the information is not consistent.

As described in more detail herein, neural network 1000 may predict all the map points that may be relevant in subsequent image frames. Such information may be used to remove jitter and or any shakiness in a given image frame.

As described in more detail herein, in various implementations, output node 1032 of neural network 1000 outputs a self-position of camera 102. In various implementations, neural network 1000 outputs higher quality estimates of total global movement based on the movement information.

For ease of illustration, FIG. 10 shows neural network 1000 as having three inputs 1012, 1014, and 1016, four hidden nodes 1022, 1024, 1026, and 1028, and one output node 1032. Neural network 1000 may have any number of input nodes, hidden nodes, and output nodes, and the particular numbers will depend on the particular implementation. Similarly, FIG. 10 shows neural network 1000 as having one hidden layer. Neural network 1000 may have any number of hidden layers, and the particular number will depend on the particular implementation. In various implementations, neural network 1000 may not have all of the components shown and/or may have other elements including other types of nodes and other types of layers instead of, or in addition to, those shown herein.

In various implementations, neural network 1000 of the system determines the self-position of camera 102 in the point cloud space. As indicated herein, neural network 1000 determines the self-position of camera 102 based on the movement information, where the self-position represents the self-position of camera 102 in the physical environment.

In some implementations, neural network 1000 is a recurrent neural network. In various implementations, a recurrent neural network has "memory" in that the recurrent neural network uses information from previous network evaluations as inputs to the network for future evaluations. In the context of implementations described herein, a recurrent neural network may be used to implicitly remember appearance information about points in the map point space that are being tracked. A recurrent neural network may also be used to remember motion patterns and model the active movement characteristics (e.g., velocity, acceleration, jitter, etc.).

In some implementations, neural network 1000 is a convolutional neural network. In various implementations, a convolutional neural network has convolutional layers within the network, where each convolutional layer may be a function applied to a subwindow around that position in the prior layer. The functions may be trained to be identical throughout the layer. In various implementations, the functions may be 2D feature patches that provide representational information about 2D images.

In some implementations, the determining of movement information is based on training of the neural network. Such training may facilitate neural network 1000 in understanding local movement of various map points. For example, training may facilitate neural network 1000 in interpreting observed behaviors associated with six degrees of separation and how such behaviors manifest in the physical environment.

In various implementations, training may include providing ground truth to the neural network (known inputs and outputs). Through optimized gradient descent and similar techniques, training may also include adjusting network weights such that a provided input activates the neural network to produce the provided output (or close to it).

In various implementations, ground truth for the system may be generated in any of the following ways. In some implementations, the system may render realistic, synthetic 3D scenes (e.g., computer graphics) along with the corresponding 3D depth information, and generate videos of a synthetic camera moving through the scene. This visual data may be used to train a system that learns to recognize movement from the synthetic video. This approach may be augmented by including synthetic sensor data as well (e.g., gyro, accelerometer) by mimicking the real motion but adding noise to the measurements.

In some implementations, the system may use an alternative (and possibly slow but accurate) SLAM system to generate the ground truth. For example, the system may capture video and sensor data coming from a cell phone or other capture device. This data may be passed to a conventional SLAM system that computes the motion output. This computed output along with the captured input may be used as ground truth to train the network. Since the ground truth data does not have to be computed in real time, the conventional SLAM system may be run in a slow (non-real time) but high-accuracy, high-computation mode to ensure the quality of the computed output is good.

In some implementations, the system may capture ground truth data with a specialized hardware system or hardware device. In various implementations, the hardware system or hardware device is configured for high accuracy. For example, the sensor and video input data may be captured by a hardware device such as a cell phone, which is itself being tracked by a cinematic motion capture system to determine the highly accurate ground truth data such as exact position and movement of the hardware device. Such truth data may then be inputted into the neural network for training.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 11:
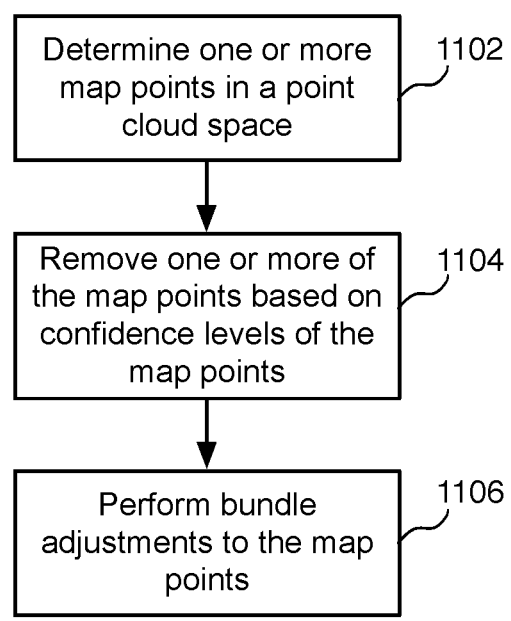
FIG. 11 illustrates an example flow diagram for mapping an environment, according to some implementations.

FIG. 11 illustrates an example flow diagram for mapping an environment, according to some implementations. While this example flow diagram for mapping an environment is described separately from the example flow diagram for determining a self-position of a camera (FIG. 5), in some implementations, the system may perform these two processes simultaneously. In some implementations, the system may also perform these two processes separately.

In various implementations, a method is initiated at block 1102, where the system determines one or more map points in a point cloud space. In various implementations, the map points are initially unknown and discovered by the system in real-time as camera 102 travels in the physical environment. In various implementations, neural network 1000 of the system determines the one or more map points in the point cloud space.

As indicated herein, in some implementations, the determination of map points may be referred to as keypoint detection. During keypoint detection, the system searches an image frame to find candidate map points. Candidate map points may be distinguishable, salient points in the image frame. In some implementations, if a given candidate point in the image frame is stable and repeatable across multiple image frames, the candidate point has the potential to become a map point, and to be added to the point cloud space to build a point cloud space map.

The system attempts to identify the same map points across different image frames taken by camera 102 over time, and the system may add such map points to the point cloud space. Such map points may represent areas of high texture in x-direction and/or y-direction and/or z-direction. Such map points may represent edge boundaries and/or other high-contrast and/or other landmarks or portions of objects in a point cloud space. Once a given map point is added to the point cloud space, the system tracks the map point in subsequent image frames.

As indicated herein, in addition to neural network 1000 tracking the self-position of camera 102, neural network 1000 also stores each self-location. As such, neural network 1000 tracks and maps the movement or path of camera 102. As camera 102 travels in the physical environment, neural network 1000 builds the point cloud space.

In some implementations, the system maintains a predetermined number of map points in the point cloud space, where the system maintains the most salient map points. In some implementations, the system may filter or remove the least salient map points in order to store the most salient map points.

In some implementations, the determining of the one or more map points may be based on neural network output based on movement information associated with image frames. In various implementations, having neural network 1000 performing the keypoint detection provides improved results, because neural network 1000 factors in various different types of positional information. In some implementations, the system may determine one or more map points that may be based on other means such as raw image pixels. The particular technique may vary and will depend on the particular implementation.

At block 1104, the system removes one or more of the map points based on confidence levels of the map points. In some implementations, the confidence level represents the confidence that a given map point is valid (e.g., that the given map point indeed exists or still exists). In some implementations, the confidence level of a given map point may change over time. For example, the system may raise the confidence level of a given map point if the map point is found during a search of a subsequent image frame. Conversely, the system may lower the confidence level of a given map point if the map point is not found during a search of a subsequent image frame. For example, if a given a given map point is found in a previous image frame but not found in the current image frame, the system lowers the confidence level of that map point. For example, an object such as a pet or bird may come into view of camera 120, but temporarily. As such, map points associated with such a fleeting object are not valid when the object leaves the view of camera 102. In some implementations, the system compares the confidence level to a predetermined confidence threshold. In various implementations, the system removes each of the map points that have a confidence level that falls below the predetermined confidence threshold.

At block 1106, the system performs bundle adjustments to the map points. In some implementations, bundle adjustment may involve the system simultaneously refining the 3D coordinates of the map points in the point cloud space. In some implementations, bundle adjustment may also involve the system simultaneously refining a series of determined self-positions of camera 102 in the point cloud space. In various implementations, the system performs such bundle adjustments as the neural network receives new information.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 12:
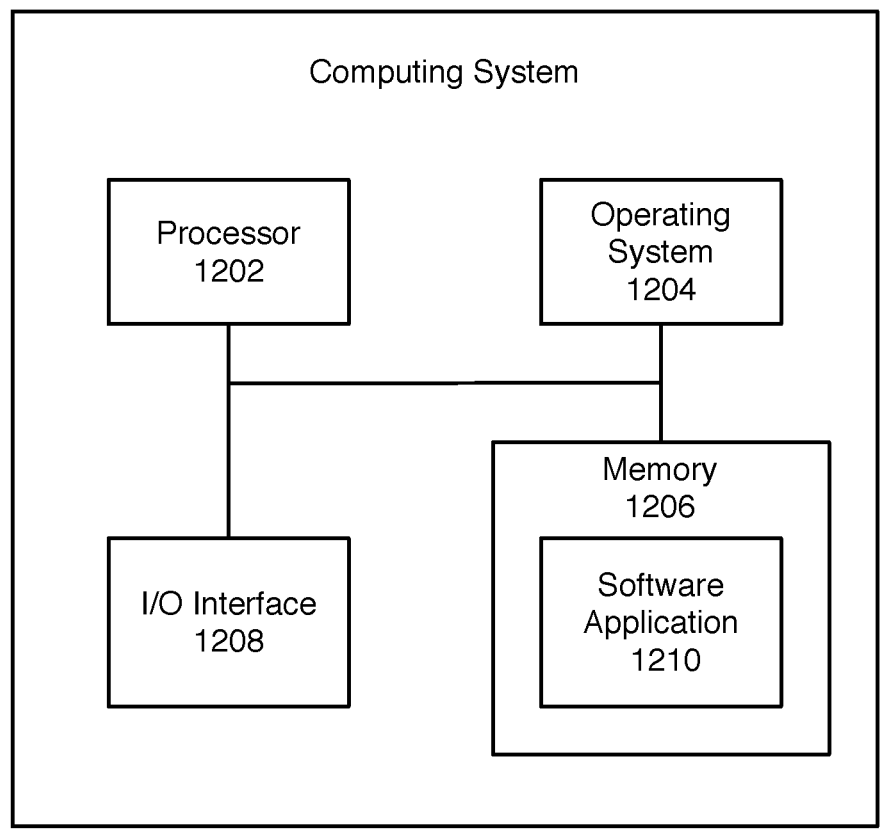
FIG. 12 illustrates a block diagram of an example computing system, which may be used for some implementations described herein.

FIG. 12 illustrates a block diagram of an example computing system 1200, which may be used for some implementations described herein. For example, computing system 1200 may be used to implement neural network 1000 of FIG. 10, as well as to perform implementations described herein. In some implementations, computing system 1200 may include a processor 1202, an operating system 1204, a memory 1206, and an input/output (I/O) interface 1208. In various implementations, processor 1202 may be used to implement various functions and features described herein, as well as to perform the method implementations described herein. While processor 1202 is described as performing implementations described herein, any suitable component or combination of components of computing system 1200 or any suitable processor or processors associated with computing system 1200 or any suitable system may perform the steps described. Implementations described herein may be carried out on a user device, on a server, or a combination of both.

Computing system 1200 also includes a software application 1210, which may be stored on memory 1206 or on any other suitable storage location or computer-readable medium. Software application 1210 provides instructions that enable processor 1202 to perform the implementations described herein and other functions. Software application 1210 may also include an engine such as a network engine for performing various functions associated with one or more networks and network communications. The components of computing system 1200 may be implemented by one or more processors or any combination of hardware devices, as well as any combination of hardware, software, firmware, etc.

For ease of illustration, FIG. 12 shows one block for each of processor 1202, operating system 1204, memory 1206, I/O interface 1208, and software application 1210. These blocks 1202, 1204, 1206, 1208, and 1210 may represent multiple processors, operating systems, memories, I/O interfaces, and software applications. In various implementations, computing system 1200 may not have all of the components shown and/or may have other elements including other types of components instead of, or in addition to, those shown herein.

In various implementations, computing system 1200 includes logic encoded in one or more non-transitory computer-readable storage media for execution by the one or more processors. When executed, the logic is operable to perform operations associated with implementations described herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method comprising:
    determining one or more map points in a point cloud space, wherein the point cloud space corresponds to a real physical environment;
    determining movement information of one or more of the map points, wherein the determining of the movement information is performed by a neural network, and wherein, to determine the movement information, the method further comprises:
        determining first positional information associated with a first image frame;
        determining second positional information associated with a second image frame; and
        determining one or more differences between the first positional information and the second positional information; and
    determining a self-position in the point cloud space based on the determined movement information.

2. The method of claim 1, wherein the movement information comprises two-dimensional changes in position in a two-dimensional window.

3. The method of claim 1, wherein the movement information comprises two-dimensional changes in rotation in a two-dimensional window.

4. The method of claim 1, wherein the movement information comprises three-dimensional changes in the point cloud space.

5. The method of claim 1, wherein the determining of the self-position is performed by the neural network.

6. The method of claim 1, wherein input to the neural network comprises two-dimensional digital images that are digitized image frames from a camera.

7. The method of claim 1, wherein input to the neural network comprises inertial information.

8. The method of claim 1, wherein the neural network is a recurrent neural network.

9. The method of claim 1, wherein the determining of movement information is based on training of the neural network.

10. The method of claim 1, wherein the determining of movement information is based on training of the neural network, and wherein the training of the neural network includes providing ground truth to the neural network by a hardware device.

11. A non-transitory computer-readable storage medium carrying program instructions thereon, the instructions when executed by one or more processors are operable to cause the one or more processors to perform operations comprising:

determining one or more map points in a point cloud space, wherein the point cloud space corresponds to a real physical environment;

determining movement information of one or more of the map points, wherein the determining of the movement information is performed by a neural network, and wherein, to determine the movement information, the instructions when executed are further operable to cause the one or more processors to perform operations comprising:

determining first positional information associated with a first image frame;

determining second positional information associated with a second image frame; and determining one or more differences between the first positional information and the second positional information; and determining a self-position in the point cloud space based on the determined movement information.

12. The computer-readable storage medium of claim 11, wherein the movement information comprises two-dimensional changes in position in a two-dimensional window.

13. The computer-readable storage medium of claim 11, wherein the movement information comprises two-dimensional changes in rotation in a two-dimensional window.

14. The computer-readable storage medium of claim 11, wherein the movement information comprises three-dimensional changes in the point cloud space.

15. The computer-readable storage medium of claim 11, wherein the determining of the self-position is performed by the neural network.

16. The computer-readable storage medium of claim 11, wherein input to the neural network comprises two-dimensional digital images that are digitized video frames from a camera.

17. A system comprising:

one or more processors;

logic encoded in one or more non-transitory computer-readable storage media for execution by the one or more processors and when executed operable to cause the one or more processors to perform operations comprising:

determining one or more map points in a point cloud space, wherein the point cloud space corresponds to a real physical environment;

determining movement information of one or more of the map points, wherein the determining of the movement information is performed by a neural network, and wherein, to determine the movement information, the logic when executed are further operable to cause the one or more processors to perform operations comprising:

determining first positional information associated with a first image frame;

determining second positional information associated with a second image frame; and determining one or more differences between the first positional information and the second positional information; and determining a self-position in the point cloud space based on the determined movement information.

18. The system of claim 17, wherein the movement information comprises two-dimensional changes in position in a two-dimensional window.

* * * * *